US011840625B2

(12) United States Patent
Boutillier et al.

(10) Patent No.: US 11,840,625 B2
(45) Date of Patent: Dec. 12, 2023

(54) (METH)ACRYLIC POLYMER COMPOSITION ITS METHOD OF PREPARATION AND USE

(71) Applicant: Trinseo Europe GmbH, Horgen (CH)

(72) Inventors: Jean-Marc Boutillier, Sauvagnon (FR); Veronique L. Carrere, Pau (FR); Stephanie Pery, Lons (FR); Sylvie Cazaumayou, Dax (FR); Sylvain Bourrigaud, Morlanne (FR)

(73) Assignee: Trinseo Europe GmbH, Pfaeffikon (CH)

( * ) Notice: Subject to any disclaimer, the term of this patent is extended or adjusted under 35 U.S.C. 154(b) by 153 days.

(21) Appl. No.: 16/955,167

(22) PCT Filed: Dec. 18, 2018

(86) PCT No.: PCT/EP2018/085618
§ 371 (c)(1),
(2) Date: Jun. 18, 2020

(87) PCT Pub. No.: WO2019/121759
PCT Pub. Date: Jun. 27, 2019

(65) Prior Publication Data
US 2020/0392325 A1 Dec. 17, 2020

(30) Foreign Application Priority Data

Dec. 18, 2017 (FR) .................. FR17.62392

(51) Int. Cl.
*C08L 33/12* (2006.01)
*C08F 220/18* (2006.01)
*B32B 27/08* (2006.01)
*B32B 27/30* (2006.01)
*C08K 5/32* (2006.01)
*F41H 5/04* (2006.01)
*B32B 17/10* (2006.01)

(52) U.S. Cl.
CPC ............. *C08L 33/12* (2013.01); *B32B 17/10* (2013.01); *B32B 27/08* (2013.01); *B32B 27/308* (2013.01); *C08F 220/1804* (2020.02); *C08K 5/32* (2013.01); *F41H 5/0407* (2013.01); *B32B 2307/558* (2013.01); *B32B 2571/02* (2013.01); *C08F 2438/02* (2013.01); *C08L 2205/22* (2013.01)

(58) Field of Classification Search
CPC ...... C08L 2205/22; C08L 33/12; C08L 53/02; C08L 33/00; C08L 53/00; B32B 27/08; B32B 27/302; B32B 27/308; B32B 27/38; B32B 17/10; B32B 2571/02; B32B 2307/558; F41H 5/26; F41H 5/0407; F41H 1/08
See application file for complete search history.

(56) References Cited

U.S. PATENT DOCUMENTS

| 4,312,903 A * | 1/1982 | Molari, Jr. ............... E06B 5/10 428/447 |
| 4,594,290 A | 6/1986 | Fischer et al. |
| 8,833,233 B2 | 9/2014 | Kruger et al. |
| 2005/0119393 A1* | 6/2005 | Ahn ........................ C08L 27/06 524/460 |
| 2009/0123721 A1 | 5/2009 | Yang |
| 2014/0062121 A1 | 3/2014 | Benz et al. |
| 2015/0038650 A1* | 2/2015 | Bourrigaud ........... C08F 299/04 525/330.3 |
| 2016/0017138 A1 | 1/2016 | Gerard |
| 2017/0362369 A1 | 12/2017 | Bourrigaud et al. |

FOREIGN PATENT DOCUMENTS

| JP | 2001355999 A | 12/2001 |
| WO | 2016097649 A1 | 6/2016 |

OTHER PUBLICATIONS

European Communication pursuant to Article 94(3) for European Application No. 18 816 147.5, dated Feb. 17, 2022, 6 pages.
Japanese Notice of Reasons for Rejection for Japanese Application No. 2020-552143, dated Jan. 17, 2023 with translation, 9 pages.

* cited by examiner

*Primary Examiner* — Alicia J Weydemeyer
(74) *Attorney, Agent, or Firm* — RatnerPrestia

(57) ABSTRACT

The present invention relates to a (meth)acrylic polymer composition. In particular the present invention it relates to polymeric composition suitable for security glazing. The invention also relates to a process for manufacturing such a polymeric composition suitable for security glazing. More particularly the present invention relates to a bullet resistant (meth)acrylic polymer composition and relates also to a process for preparing such a bullet resistant (meth)acrylic polymer composition and its use in glazing.

21 Claims, No Drawings

(METH)ACRYLIC POLYMER COMPOSITION ITS METHOD OF PREPARATION AND USE

This application claims benefit, under U.S.C. § 119 or § 365 of PCT Application Number PCT/EP2018/085618, filed Dec. 18, 2018, and French Patent Application Number FR 17.62392 filed Dec. 18, 2017, these documents being incorporated herein by reference.

FIELD OF THE INVENTION

The present invention relates to a (meth)acrylic polymer composition.

In particular the present invention it relates to polymeric composition suitable for security glazing. The invention also relates to a process for manufacturing such a polymeric composition suitable for security glazing.

More particularly the present invention relates to a bullet resistant (meth)acrylic polymer composition and relates also to a process for preparing such a bullet resistant (meth)acrylic polymer composition and its use in glazing.

Technical Problem

Acrylic and (meth)acrylic polymers, often just called PMMA, are widely used for their transparence and scratch resistance. Especially excellent optical properties are valued, in particular the gloss and a high transparency with a transmission of at least 90% of visible light. However, it is also a brittle impact-sensitive thermoplastic material. This characteristic is related to the fact that the glass transition temperature of PMMA is approximately 110° C., so that, in this material, the polymer chains are not capable of readily moving at ambient temperature. The impact performance needs to be improved for some applications, while retaining its transparency.

The impact strengthening in the case of acrylic and (meth)acrylic polymers both usually simply called poly methyl methacrylate (PMMA) is generally improved through the introduction into the acrylic resin of an impact additive.

One of the most common impact additive known is a core-shell additive, which is provided in the form of multilayer spherical particles. These particles are prepared by emulsion polymerization in a multistage process and are recovered in the powder form by atomization. They generally comprise a sequence of "hard" and "soft" layers. It is thus possible to find two-layer (soft-hard) or three-layer (hard-soft-hard) particles or sometimes even more layers.

In the case of cast acrylic sheets, obtained by polymerization of the mixture of monomers in a mold, the impact additive is dispersed beforehand in the mixture of monomers. In the case of extruded acrylic sheets, the impact additive is compounded in the extruder with the acrylic resin. In both cases, it is necessary for the impact additive to be well dispersed within the acrylic resin in order to maintain an unchanging and homogeneous level of impact strength.

In the case of bullet resistance the requirements are challenging compared to standard impact resistance as a bullet hits the material at very high velocity.

For stopping a bullet the material can be very thick which makes its also heavy weight, which is for example the case for glass Laminates are also used. The glass laminates are very heavy and tend to shatter when a bullet hits it.

Laminated materials are more complicated and typically more costly to produce than monolithic sheet. The glass clad laminates and the plastic laminates are also very expensive to produce but not quite as heavy to handle.

The material used is transparent and when becoming dirty it is cleaned, including solvents and other chemicals. Therefore the material should be solvent resistant.

The material is used in different environments, including change of temperature. Therefore the material should stay transparent with environmental changes, especially temperature changes.

There is a need for lightweight impact-resistant glazing for use in bullet-resistant applications.

There is a need for lightweight impact-resistant glazing for use in bullet-resistant applications that does not shatter and keeps its transparency whatever the temperature is.

The objective of the present invention is to provide a (meth)acrylic polymer composition with improved bullet resistance, notably for bullet resistant glazing.

Another objective of the present invention is also provide a (meth)acrylic polymer composition for light weight bullet resistant glazing.

An additional objective of the present invention is to avoid or reduce significantly the weight or thickness of (meth)acrylic polymer compositions suitable for bullet resistant applications.

Still an additional objective is to provide a process for manufacturing a (meth)acrylic polymer compositions suitable for bullet resistant applications.

A still additional objective is to provide a process for manufacturing a (meth)acrylic polymer compositions for light weight bullet resistant glazing.

Still a further objective is the use of (meth)acrylic polymer composition for bullet resistant glazing.

A further objective is to provide a (meth)acrylic bullet resistant polymer composition that keeps its brilliant surface aspect and its transparency over a temperature interval from −30° C. to 60° C.

A still further objective is to provide a bullet resistant composition that can be thermoformed, but keeps its brilliant surface aspect and its transparency over a temperature interval from −30° C. to 60° C.

A further additional objective is to provide a process for manufacturing a (meth)acrylic polymer compositions suitable for bullet resistant applications, that keeps its brilliant surface aspect and its transparency over a temperature interval from −30° C. to 60° C.

BACKGROUND OF THE INVENTION

Prior Art

The document WO2012/130595 discloses the use of coated mouldings consisting of impact modified polymethylmethacrylate polymers with high molecular mass as windows for passenger cars or utility vehicles. A moulding composition is disclosed comprising 0.5 to 35 wt % of at least one core-shell-shell particle as impact modifier.

The document U.S. Pat. No. 4,594,290 discloses an impact resistant laminate. The impact resistant laminate includes several ply's, one made of cast acrylic sheet. The transparent laminates have an improved ballistic response.

The document WO2012/085487 discloses the transparent and impact-resistant crosslinked acrylic composition consisting of a brittle matrix having a glass transition temperature of greater than 0° C. and of elastomeric domains having a characteristic dimension of less than 100 nm consisting of macromolecular sequences having a flexible nature with a glass transition temperature of less than 0° C., where the elastomeric domain are part of a blockcopolymer made by PRC.

The document WO2009/149951 discloses a bullet resistant transparent laminate composite and protection arrangement having a bullet resistant transparent laminated composite.

The document WO2007/0044063 discloses a transparent bullet resistant acrylic sheet. The sheet is composed of copolymer of methyl methacrylate and a $C_{2-18}$ alkyl methacrylate plus impact modifiers that are refractive index matched or mismatched with the polymer matrix. The preferred impact modifiers are core-shell multilayer polymers and block copolymers having at least one hard and at least one soft block.

None of the prior art documents discloses a polymeric composition as claimed or a process for obtaining it or its use.

BRIEF DESCRIPTION OF THE INVENTION

Surprisingly it has been found that a polymeric composition comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol, is suitable for bullet resistant applications and especially bullet resistant sheets.

Surprisingly it has also been found that a polymeric composition comprising a crosslinked (meth)acrylic composition consisting of a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol, can be used in bullet resistant glazing applications.

Surprisingly it has also been found that the use of a polymeric composition comprising a crosslinked ((meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol, as a sheet yields to bullet resistance sheet that has also a good solvent resistance and transparency over a large temperature interval.

Surprisingly it has also been found that a process for a manufacturing a polymeric composition comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol, by a cast sheet process yields to bullet resistant sheets, having a good solvent resistance and transparency over a large temperature interval.

DETAILED DESCRIPTION OF THE INVENTION

According to a first aspect, the present invention relates to a polymeric composition comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol.

According to a second aspect, the present invention relates to the use of polymeric composition comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol, for bullet resistant applications.

According to a third aspect, the present invention relates to a process for manufacturing the polymeric composition comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol, said process comprises the steps of:
  a) preparing the macromolecular sequences (II) by mixing, with the monomer(s) intended to form the macromolecular sequences (II), an alkoxyamine of general formula $Z(-T)_n$, in which Z denotes a polyvalent group, T denotes a nitroxide and n is an integer greater than or equal to 1;
  b) mixing the macromolecular sequences (II) of step a) with methyl methacrylate, and optionally a crosslinking agent, optionally at least one comonomer M and optionally at least one radical initiator;
  c) mixing the composition comprising the macromolecular sequences (II) and methyl methacrylate with crosslinking agent, optionally at least one comonomer M and at least one radical initiator, if it has not been done yet in step b);
  d) casting the mixture obtained in previous step in a mold and then heating it according to a temperature cycle in order to obtain a cast sheet.

According to a fourth aspect the present invention relates to a polymeric composition suitable for bullet resistance applications, comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol.

By the term "copolymer" as used is denoted that the polymer consists of at least two different monomers.

By the term "(meth)acrylic monomer" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "impact modifier" as used is understood a material that once incorporated in a polymeric material increases the impact resistance and toughness of that polymeric material by phase micro domains of a rubbery material or rubber polymer.

By the term "rubber" as used is denoted to the thermodynamic state of the polymer above its glass transition.

By the term "rubber polymer" as used is denoted a polymer that has a glass transition temperature (Tg) below 0° C.

By the term "crosslinking" as used is meant a polymer copolymer, some of the chains of which are connected to one another via covalent bonds or chemical or physical interactions. These chains, connected to one another, are for the most part distributed in the 3 dimensions of the space.

By the term "transparent" as used is meant that the composition has a high light transmission of at least 80% in the visible light.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

With regard to the polymeric composition of the invention, it comprises a crosslinked (meth) acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol.

In a specific embodiment the polymeric composition of the invention, it comprises a crosslinked (meth) acrylic composition consisting of a brittle matrix (I) having a glass transition temperature Tg of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol As regards the matrix (I), it exhibits an overall Tg of greater than 0° C., measured by differential scanning calorimetry (DSC), and is compatible with the methyl methacrylate homo- or copolymer. Preferably glass transition temperature Tg is greater than 10° C., more preferably greater than 20° C., still more preferably greater than 40° C. even more preferably greater than 40° C., advantageously greater than 50° C. and more advantageously greater than 60° C.

The matrix (I) is prepared from methyl methacrylate and optionally one or more monomer(s) Mo1 chosen from:

acrylic monomers of formula $CH_2=CH-C(=O)-O-R_1$, where $R_1$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, acrylic acid, methyl acrylate, ethyl acrylate, propyl acrylate, n-butyl acrylate, isobutyl acrylate, tert-butyl acrylate, 2-ethylhexyl acrylate, glycidyl acrylate, hydroxyalkyl acrylates or acrylonitrile;

methacrylic monomers of formula $CH_2=C(CH_3)-C(=O)-O-R_2$, where $R_2$ denotes a hydrogen atom or a linear, cyclic or branched $C_1$-$C_4$n alkyl group optionally substituted by a halogen atom or a hydroxyl, alkoxy, cyano, amino or epoxy group, such as, for example, methacrylic acid, methyl methacrylate, ethyl methacrylate, propyl methacrylate, n-butyl methacrylate, isobutyl methacrylate, tert-butyl methacrylate, 2-ethylhexyl methacrylate, glycidyl methacrylate, hydroxyalkyl methacrylates or methacrylonitrile;

vinylaromatic monomers, such as, for example, styrene or substituted styrenes, such as α-methylstyrene, monochlorostyrene or tert-butylstyrene.

The comonomer(s) are chosen in nature and quantity that the lower limit of the glass transition temperature Tg is met.

Preferably methyl methacrylate (MMA) is the predominant monomer in the polymer of the matrix (I). The matrix (I) thus includes a proportion of methyl methacrylate of from 51 wt % to 100 wt %, preferably between 75 wt % and 100 wt % and advantageously between 90 wt % and 100 wt %.

As regards the macromolecular sequences (II) having a flexible nature, said macromolecular sequences (II) they are also called block B in the present invention. These macromolecular sequences (II) having a flexible nature exhibit a glass transition temperature of less than 0° C. (denoted Tg and measured by DSC) Preferably the Tg is less than −5° C., more preferably less than −10° C. and even more preferably less than −15° C.

Preferably these macromolecular sequences (II) having a flexible nature exhibit a glass transition temperature of more than −100° C. (denoted Tg and measured by DSC). More preferably the Tg is more than −90° C., still more preferably more than −80° C. and even more preferably more than −70° C. More preferably these macromolecular sequences (II) having a flexible nature exhibit a glass transition temperature between −100° C. and 0° C., even more preferably −90° C. and −5° C., still more preferably −80° C. and −10° C. and still even more preferably −70° C. and −15° C.

Furthermore, the weight-average molecular weight of the macromolecular sequences (II) having a flexible nature with a glass transition temperature of less than 0° C. is between 150 000 g/mol and 800 000 g/mol.

Preferably the weight-average molecular weight of the macromolecular sequences (II) having a flexible nature with a glass transition temperature of less than 0° C. is between 175 000 and 700 000 g/mol, more preferably between 200 000 g/mol and 650 000 g/mol, and advantageously between 225 000 g/mol and 600 000 g/mol.

In a first preferred embodiment the weight-average molecular weight Mw of the macromolecular sequences (II)

having a flexible nature with a glass transition temperature of less than 0° C. is between 240 000 g/mol and 600 000 g/mol.

In a second preferred embodiment the weight-average molecular weight Mw of the macromolecular sequences (II) having a flexible nature with a glass transition temperature of less than 0° C. is between 255 000 g/mol and 600 000 g/mol.

The polydispersity index PI of the molecular weight Mw/Mn of the macromolecular sequences (II) having a flexible nature or block B is greater than 2, preferably greater than 2.1, more preferably greater than 2.2, still more preferably greater than 2.3, even more preferably greater than 2.4, still even more preferably greater than 2.5, advantageously greater than 2.5, more advantageously greater than 2.6 and even more advantageously greater than 3.

The polydispersity index PI of the molecular weight PI=Mw/Mn is between 2.0 and 10.0, preferably between 2.1 and 10, more preferably between 2.2 and 10, still more preferably between 2.3 and 10, even more preferably between 2.4 and 10, still even more preferably between 2.4 and 10, advantageously between 2.5 and 10.0 more advantageously between 3.0 and 10.0, even more advantageously between 3.0 and 6.0 and still even more advantageously between 3.0 and 5.0.

The macromolecular sequences (II) are prepared from one or more monomer(s) Mo2 chosen from:
  acrylic monomers of formula $CH_2=CH-C(=O)-O-R_1$, where $R_1$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, acrylic acid, methyl acrylate, ethyl acrylate, propyl acrylate, n-butyl acrylate, isobutyl acrylate, tert-butyl acrylate, 2-ethylhexyl acrylate, glycidyl acrylate, hydroxyalkyl acrylates or acrylonitrile;
  methacrylic monomers of formula $CH_2=C(CH_3)-C(=O)-O-R_2$, where $R_2$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, methacrylic acid, methyl methacrylate, ethyl methacrylate, propyl methacrylate, n-butyl methacrylate, isobutyl methacrylate, tert-butyl methacrylate, 2-ethylhexyl methacrylate, glycidyl methacrylate, hydroxyalkyl methacrylates or methacrylonitrile;
  vinylaromatic monomers, such as, for example, styrene or substituted styrenes, α-methylstyrene, monochlorostyrene or tert-butylstyrene.

The macromolecular sequences (II) are not prepared from a diene. A person skilled in the art knows how to combine these monomers so as to adjust:
  the overall Tg of the block B. In order to obtain a block B with a Tg of less than 0° C., it is necessary to use at least one monomer exhibiting a Tg of less than 0° C., for example butyl acrylate or 2-ethylhexyl acrylate;
  the refractive index of the block B, which has to be as close as possible to that of the matrix (I) in order to provide the best possible transparency when the transparency is required for the targeted application.

The macromolecular sequences (II) can be composed solely of a monomer exhibiting a Tg of less than 0° C. (once the monomer has been polymerized), for example butyl acrylate or 2-ethylhexyl acrylate. The macromolecular sequences (II) can also be composed of at least one alkyl acrylate and of a vinylaromatic monomer. Advantageously, the macromolecular sequences (II) are composed of butyl acrylate and styrene in the butyl acrylate/styrene ratio by weight of between 70/30 and 90/10, preferably between 75/25 and 85/15.

The content of block B (the macromolecular sequences (II)) in the polymeric composition is between 1 wt % and 30% by weight, preferably between 2 wt % and 20% by weight more preferably 2 wt % to 15 wt %, with respect to the polymeric composition comprising crosslinked (meth)acrylic composition and macromolecular sequences (II).

As regards the compounds which make the crosslinking possible (the crosslinking agent), they are preferably polyfunctional acrylic monomers, such as, for example, polyol polyacrylates, alkylene glycol polyacrylates or allyl acrylate, ethylene glycol diacrylate, 1,3-butylene glycol diacrylate or 1,4-butylene glycol diacrylate, polyfunctional methacrylic monomers, such as polyol polymethacrylates, alkylene glycol polymethacrylates or allyl methacrylate, ethylene glycol dimethacrylate, 1,3-butylene glycol dimethacrylate or 1,4-butylene glycol dimethacrylate, divinylbenzene or trivinylbenzene. In a first preferred embodiment it is 1,4-butylene glycol dimethacrylate (BDMA).

The content of crosslinking agent is between 0.05% and 10% by weight, with respect to the crosslinked acrylic composition which is the subject matter of the invention.

Preferably the content of crosslinking agent is between 0.05% and 10% by weight, with respect to the MMA and the monomer Mo1 of crosslinked acrylic composition which are a subject matter of the invention.

More preferably, the content of crosslinking agent is between 0.4% and 8% by weight, with respect to the to the MMA and the monomer M01 of the crosslinked acrylic composition which are a subject matter of the invention, and more preferably between 0.5% and 5% by weight, still more preferably between 0.6% and 5% by weight, still more preferably between 0.8% and 5% by weight, still more preferably between 0.9% and 5% by weight and even more preferably between 1 wt % and 5 wt %.

The composition according to the invention possesses a swelling index of less than 200% in acetone at 20° C., preferably less than 190%, even more preferably less than 180% and most preferably less than 175%.

The composition according to the invention possesses a swelling index of between 0% and 200%, preferably between 0 and 190%, even more preferably between 0% and 180% and most preferably between 0% and 175%.

The composition according to the invention is preferably in form of a sheet. Preferably it is a cast sheet. The sheet can be a flat sheet or a non-flat sheet. A non-flat sheet can be obtained by example by first making a flat sheet and then thermoforming this flat sheet in order to obtain a non-flat sheet in form of a slightly curved sheet.

Thickness of the sheet is between 1 mm and 50 mm, preferably the thickness is between 1 mm and 45 mm, more preferably between 1 and 40 mm, even more preferably between 1 mm and 35 mm, advantageously between 2 mm and 35 mm.

The content of block B (the macromolecular sequences (II)) in the sheet is between 1% and 30% by weight, preferably between 2% and 20% by weight, weight more preferably 2 wt % to 15 wt %, with respect to the polymeric composition comprising crosslinked (meth)acrylic composition and macromolecular sequences (II).

With regard to the process for manufacturing the the polymeric composition comprising a crosslinked (meth) acrylic composition comprising or consisting of a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol, said process comprises the steps of
  a) preparing the macromolecular sequences (II)
  b) mixing the macromolecular sequences (II) of step a) with methyl methacrylate, and optionally a crosslinking agent, optionally at least one comonomer M01 and optionally at least one radical initiator;
  c) mixing the composition comprising the macromolecular sequences (II) and methyl methacrylate with crosslinking agent, optionally at least one comonomer M01 and at least one radical initiator, if it has not been done yet in step b);
  d) casting the mixture obtained in previous step in a mold and then heating it according to a temperature cycle in order to obtain a cast sheet.

According to a first preferred embodiment of the process of the invention, for manufacturing the the polymeric composition, the process is a preparation of cast sheets made of methyl methacrylate homo- or copolymer which are impact-reinforced using the macromolecular sequences (II) comprises the following steps:
  a) preparing the macromolecular sequences (II) by mixing, with the monomer(s) intended to form the macromolecular sequences (II), an alkoxyamine of general formula $Z(-T)_n$, in which Z denotes a polyvalent group, T denotes a nitroxide and n is an integer greater than or equal to 1;
  b) mixing the macromolecular sequences (II) of step a) with methyl methacrylate, and optionally a crosslinking agent, optionally at least one comonomer M01 and optionally at least one radical initiator;
  c) mixing the composition comprising the macromolecular sequences (II) and methyl methacrylate with crosslinking agent, optionally at least one comonomer M01 and at least one radical initiator, if it has not been done yet in step b);
  d) casting the mixture obtained in previous step in a mold and then heating it according to a temperature cycle in order to obtain a cast sheet.

According to a second preferred embodiment of the process of the invention, for manufacturing the the polymeric composition, the process is a preparation of cast sheets made of methyl methacrylate homo- or copolymer which are impact-reinforced using the macromolecular sequences (II) comprises the following steps:
  a) preparing the macromolecular sequences (II) by mixing, with the monomer(s) intended to form the macromolecular sequences (II), an alkoxyamine of general formula $Z(-T)_n$, in which Z denotes a polyvalent group, T denotes a nitroxide and n is an integer greater than or equal to 1;
  b1) mixing the macromolecular sequences (II) of step a) with methyl methacrylate;
  b2) partly polymerizing the mixture of the macromolecular sequences (II) and methyl methacrylate and adding optionally additional methyl methacrylate
  c) mixing the composition partly polymerized with crosslinking agent, optionally at least one comonomer M01 and at least one radical initiator;
  d) casting the mixture obtained in previous step in a mold and then heating it according to a temperature cycle in order to obtain a cast sheet.

According to a third preferred embodiment of the process of the invention, for manufacturing the the polymeric composition, the process is a preparation of cast sheets made of methyl methacrylate homo- or copolymer which are impact-reinforced using the macromolecular sequences (II) comprises the following steps:
  a1) preparing an alkoxyamine of general formula $Z(-T)_n$, in which Z denotes a polyvalent group, T denotes a nitroxide and n is an integer greater than or equal to 1;
  a2) preparing the macromolecular sequences (II) by mixing, with the monomer(s) intended to form the macromolecular sequences (II) with the alkoxyamine of a1);
  b1) mixing the macromolecular sequences (II) of step a2) with methyl methacrylate;
  b2) partly polymerizing the mixture of the macromolecular sequences (II) and methyl methacrylate and adding optionally additional methyl methacrylate
  c) mixing the composition partly polymerized with crosslinking agent, optionally at least one comonomer M01 and at least one radical initiator;
  d) casting the mixture obtained in previous step in a mold and then heating it according to a temperature cycle in order to obtain a cast sheet.

The crosslinking agent and the comonomer M01 are the same as defined before.

With regards to alkoxyamine, it can be any type of alkoxyamine. It may also be a poly-alkoxyamine, which is capable of generating several nitroxide radicals, or alternatively a macromolecular alkoxyamine or macromolecular poly-alkoxyamine derived from a step of polymerization between at least one monomer and an alkoxyamine.

Thus, according to a first embodiment of the invention, at least one of the alkoxyamines is monofunctional.

According to a second form of the invention, at least one of the alkoxyamines is multifunctional.

The alkoxyamine or the poly-alkoxyamine is described by the general formula $Z(-T)_n$ in which Z denotes a multivalent group, T a nitroxide and n an integer greater than or equal to 1, preferably from 2 to 10, advantageously from 2 to 8 and more preferably from 2 to 4, limits inclusive.

n represents the functionality of the alkoxyamine, i.e. the number of nitroxide radicals T that can be released by the alkoxyamine according to the mechanism:

This reaction is activated is activated by the temperature. In the presence of monomer(s), the activated alkoxyamine initiates a polymerization. The scheme below illustrates the preparation of a copolymer polyM2-polyM1-polyM2 based on an alkoxyamine for which n=2. The monomer M1 is first polymerized after activation of the alkoxyamine, and, once the block polyM1 is complete, the monomer M2 is then polymerized:

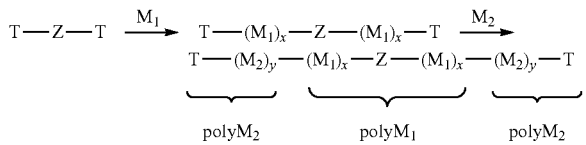

The principle of the preparation of block copolymers remains valid for n greater than or equal to 1.

Z denotes a multivalent group, i.e. a group that can release several radical sites after activation. The activation in question takes place by cleavage of the covalent bond Z-T.

By way of example, Z may be chosen from groups (I) to (VIII) below:

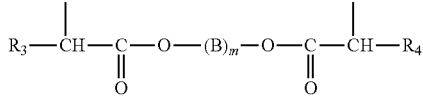
(I)

in which $R_3$ and $R_4$, which may be identical or different, represent a linear or branched alkyl radical containing a number of carbon atoms ranging from 1 to 10, phenyl or thienyl radicals optionally substituted with a halogen atom such as F, Cl or Br, or alternatively with a linear or branched alkyl radical containing a number of carbon atoms ranging from 1 to 4, or alternatively with nitro, alkoxy, aryloxy, carbonyl or carboxyl radicals; a benzyl radical, a cycloalkyl radical containing a number of carbon atoms ranging from 3 to 12, a radical comprising one or more unsaturations; B represents a linear or branched alkylene radical containing a number of carbon atoms ranging from 1 to 20; m is an integer ranging from 1 to 10;

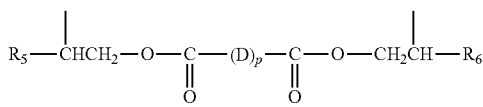
(II)

in which $R_5$ and $R_6$, which may be identical or different, represent aryl, pyridyl, furyl or thienyl radicals optionally substituted with a halogen atom such as F, Cl or Br, or alternatively with a linear or branched alkyl radical containing a number of carbon atoms ranging from 1 to 4, or alternatively with nitro, alkoxy, aryloxy, carbonyl or carboxyl radicals; D represents a linear or branched alkylene radical containing a number of carbon atoms ranging from 1 to 6, a phenylene radical or a cycloalkylene radical; p is an integer ranging from 1 to 10;

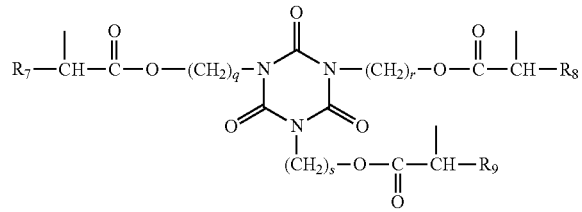
(III)

in which $R_7$, $R_8$ and $R_9$, which may be identical or different, have the same meanings as $R_3$ and $R_4$ of formula (I), q, r and s are integers ranging from 1 to 10;

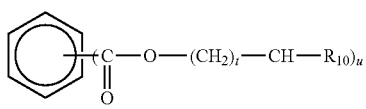
(IV)

in which $R_{10}$ has the same meaning as $R_5$ and $R_6$ of formula (II), t is an integer ranging from 1 to 4, u is an integer between 2 and 6 (the aromatic group is substituted);

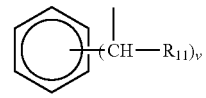
(V)

in which $R_{11}$ has the same meaning as the radical $R_{10}$ of formula (IV) and v is an integer between 2 and 6;

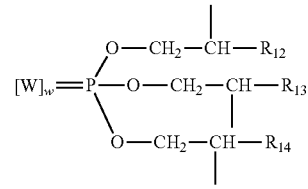
(VI)

in which $R_{12}$, $R_{13}$ and $R_{14}$, which may be identical or different, represent a phenyl radical, optionally substituted with a halogen atom such as Cl or Br, or alternatively with a linear or branched alkyl radical, containing a number of carbon atoms ranging from 1 to 10; W represents an oxygen, sulfur or selenium atom, w is equal to 0 or 1;

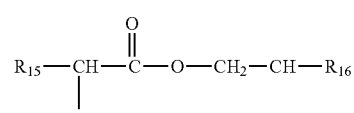
(VII)

in which $R_1$ has the same meaning as $R_3$ of formula (I), $R_{16}$ has the same meaning as $R_5$ or $R_6$ of formula (II);

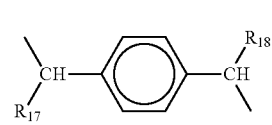
(VIII)

in which $R_{17}$ and $R_{18}$, which may be identical or different, represent a hydrogen atom or a linear or branched alkyl radical containing a number of carbon atoms ranging from 1 to 10, an aryl radical, optionally substituted with a halogen atom or a heteroatom.

T denotes a nitroxide, which is a stable free radical bearing a group =N—O*, i.e. a group on which an unpaired electron is present. The term "stable free radical" denotes a radical that is so persistent and unreactive toward atmospheric air and moisture that it can be handled and stored for a much longer time than the majority of free radicals (see in this respect *Accounts of Chemical Research* 1976, 9, 13-19). The stable free radical thus differs from free radicals whose lifetime is fleeting (from a few milliseconds to a few seconds) such as free radicals derived from the usual polymerization initiators, for instance peroxides, hydroperoxides or azo initiators. A free radical may be said to be stable if it is not a polymerization initiator and if the average lifetime of the radical is at least one minute.

T is represented by the structure:

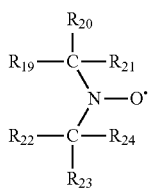

(IX)

in which $R_{19}$, $R_{20}$, $R_{21}$, $R_{22}$, $R_{23}$ and $R_{24}$ denote groups from among:
- linear or branched $C_1$-$C_{20}$ and preferably $C_1$-$C_{10}$ alkyls such as substituted or unsubstituted methyl, ethyl, propyl, butyl, isopropyl, isobutyl, tert-butyl or neopentyl,
- substituted or unsubstituted $C_6$-$C_{30}$ aryls such as benzyl or aryl(phenyl)
- saturated $C_1$-$C_{30}$ cyclics and in which the groups $R_{19}$ and $R_{22}$ may form part of an optionally substituted cyclic structure $R_{19}$—CNC—$R_{22}$ which may be chosen from:

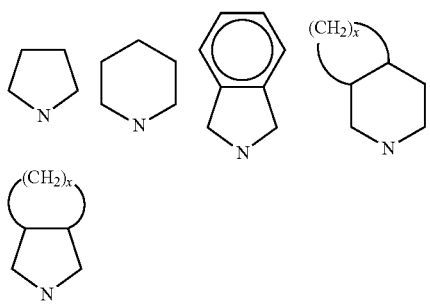

in which x denotes an integer between 1 and 12.

By way of example, use may be made of the following nitroxides:

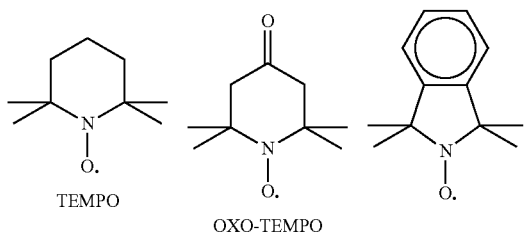

TEMPO    OXO-TEMPO

The nitroxides of formula (X) are particularly preferably used:

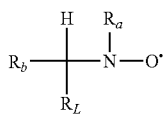

(X)

$R_a$ and $R_b$ denoting identical or different alkyl groups bearing from 1 to 40 carbon atoms, optionally linked together so as to form a ring and optionally substituted with hydroxyl, alkoxy or amino groups, $R_L$ denoting a monovalent group with a molar mass of greater than 15.42 g/mol and preferably greater than 30 g/mol. The group $R_L$ may have, for example, a molar mass of between 40 and 450 g/mol. It is preferably a phosphorus-bearing group of general formula (XI):

(XI)

in which X and Y, which may be identical or different, may be chosen from alkyl, cycloalkyl, alkoxyl, aryloxyl, aryl, aralkyloxyl, perfluoroalkyl and aralkyl radicals, and may comprise from 1 to 20 carbon atoms; X and/or Y may also be a halogen atom such as a chlorine, bromine or fluorine atom.

Advantageously, $R_L$ is a phosphonate group of formula:

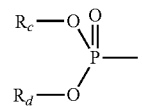

(XII)

in which $R_e$ and $R_d$ are two identical or different alkyl groups, optionally linked so as to form a ring, comprising from 1 to 40 optionally substituted or unsubstituted carbon atoms.

The group $R_L$ may also comprise at least one aromatic ring such as the phenyl radical or the naphthyl radical, which is substituted, for example, with one or more alkyl radicals comprising from 1 to 10 carbon atoms.

The nitroxides of formula (X) are preferred since they make it possible to obtain good control of the radical polymerization of the (meth)acrylic monomers, as is taught in WO 03/062 293. The alkoxyamines of formula (XIII) bearing a nitroxide of formula (X) are thus preferred:

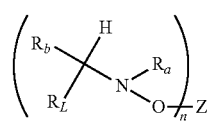

(XIII)

in which:
Z denotes a multivalent group;

$R_a$ and $R_b$ denote identical or different alkyl groups bearing from 1 to 40 carbon atoms, optionally linked together so as to form a ring and optionally substituted with hydroxyl, alkoxy or amino groups;

$R_L$ denotes a monovalent group with a molar mass of greater than 15.042 g/mol and preferably greater than 30 g/mol. The group $R_L$ may have, for example, a molar mass of between 40 and 450 g/mol. It is preferably a phosphorus-bearing group of general formula (XI):

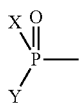
(XI)

in which X and Y, which may be identical or different, may be chosen from alkyl, cycloalkyl, alkoxyl, aryloxyl, aryl, aralkyloxyl, perfluoroalkyl and aralkyl radicals, and may comprise from 1 to 20 carbon atoms; X and/or Y may also be a halogen atom such as a chlorine, bromine or fluorine atom.

Advantageously, $R_L$ is a phosphonate group of formula:

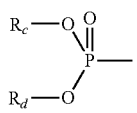
(XII)

in which $R_e$ and $R_d$ are two identical or different alkyl groups, optionally linked so as to form a ring, comprising from 1 to 40 optionally substituted or unsubstituted carbon atoms.

The group $R_L$ may also comprise at least one aromatic ring such as the phenyl radical or the naphthyl radical, which is substituted, for example, with one or more alkyl radicals comprising from 1 to 10 carbon atoms.

By way of example of nitroxide of formula (X) that may be borne by the alkoxyamine (XIII), mention may be made of:

N-tert-butyl-1-phenyl-2-methylpropyl nitroxide,
N-(2-hydroxymethylpropyl)-1-phenyl-2-methylpropyl nitroxide,
N-tert-butyl-1-dibenzylphosphono-2,2-dimethylpropyl nitroxide,
N-tert-butyl-1-bis(2,2,2-trifluoroethyl)phosphono-2,2-dimethylpropyl nitroxide,
N-tert-butyl[(1-diethylphosphono)-2-methylpropyl]nitroxide,
N-(1-methylethyl)-1-cyclohexyl-1-(diethylphosphono) nitroxide,
N-(1-phenylbenzyl)-[(1-diethylphosphono)-1-methylethyl]nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphonomethylethyl nitroxide, or alternatively the nitroxide of formula:

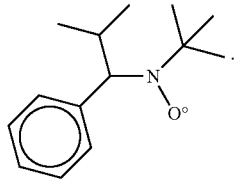

The nitroxide of formula (XIV) is particularly preferred:

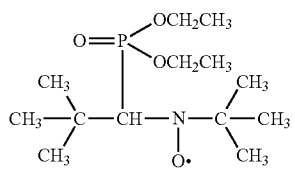
(XIV)

It is N-tert-butyl-1-diethylphosphono-2,2-dimethylpropyl nitroxide, commonly known for simplicity as SG1.

The alkoxyamine (I), and especially the alkoxyamine (XIII), may be prepared via recipes described, for example, in FR 2 791 979. One method that may be used consists in coupling a carbon-based radical with a nitroxide. The coupling may be performed starting with a halogenated derivative in the presence of an organometallic system such as CuX/ligand (X=Cl or Br) according to a reaction of ATRA (atom-transfer radical addition) type as described by D. Greszta et al. in *Macromolecules* 1996, 29, 7661-7670.

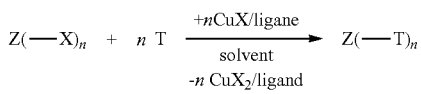

Alkoxyamines that may be used in the context of the invention are represented below:

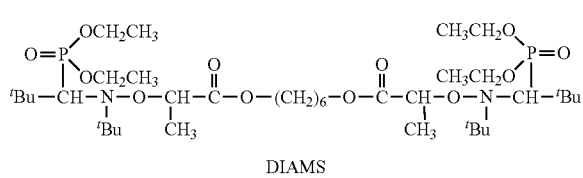
DIAMS

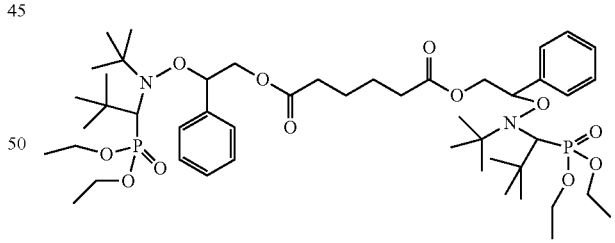

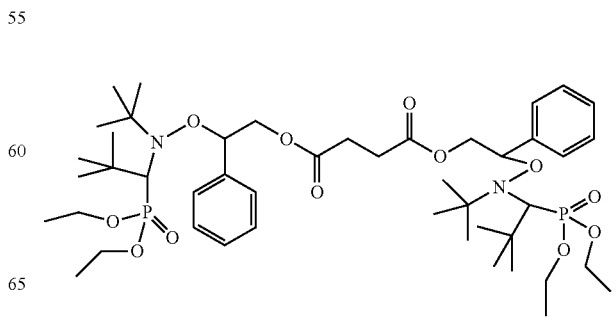

-continued

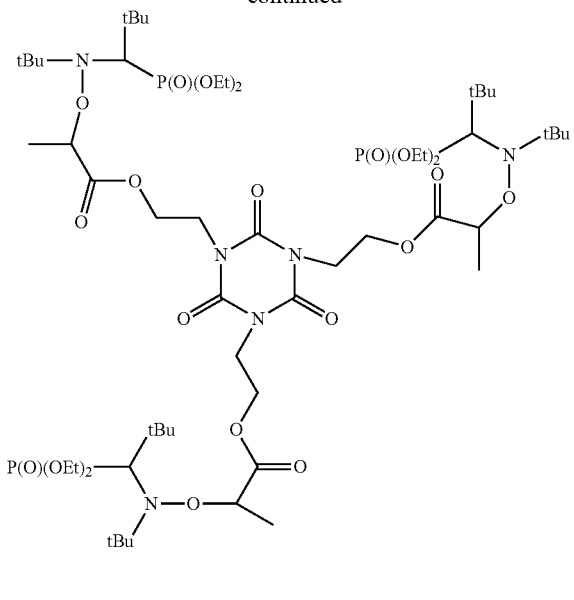
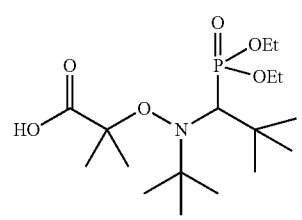
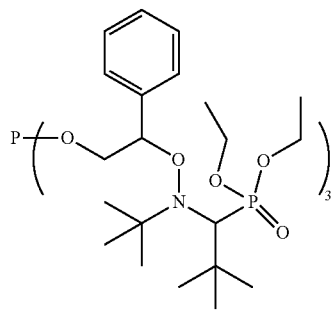
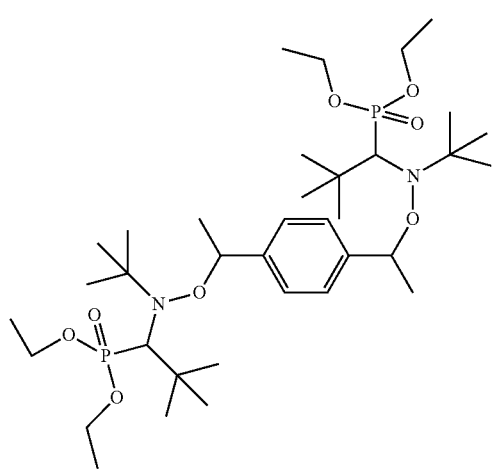

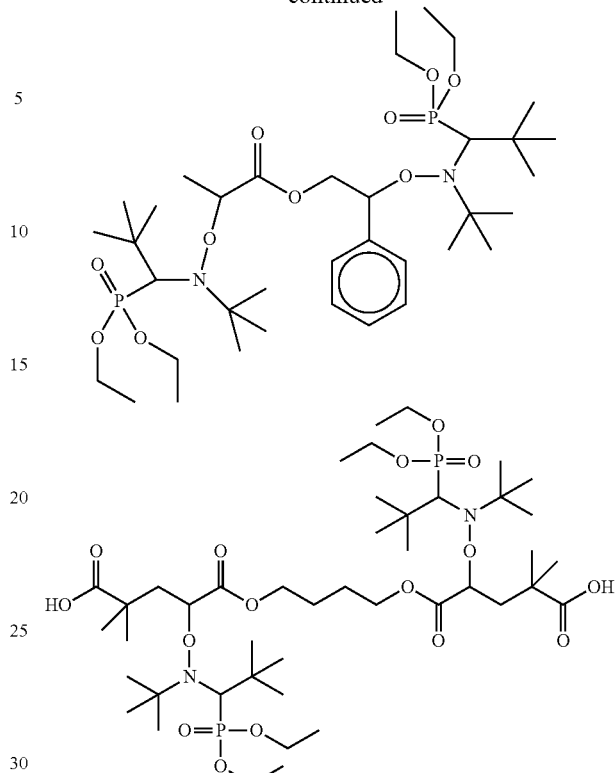
DIAMINS

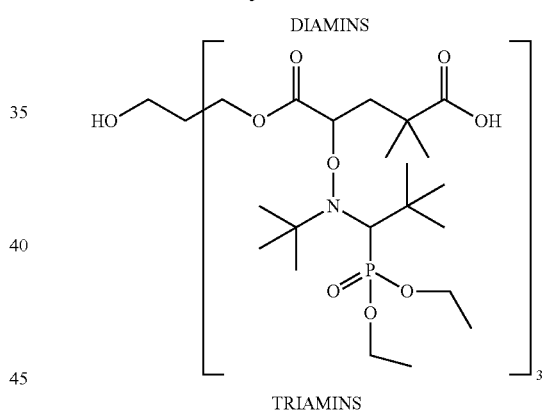
TRIAMINS

The last two alkoxyamines are called DIAMINS and TRIAMINS, respectively, and are the preferred alkoxyamines.

Advantageously the alkoxyamine called TRIAMINS is chosen for the process according to the invention.

With regards to the step b1) of mixing the macromolecular sequences (II) of step a) with methyl methacrylate, it is made that the macromolecular sequences (II) presents between 30 wt % and 60 wt % preferably between 35 wt % and 55 wt % of the mixture comprising the macromolecular sequences (II) and the methyl methacrylate.

With regards to the step b2) of partly polymerizing the mixture of the macromolecular sequences (II) and methyl methacrylate, it is done by heating the mixture. The mixture is heated to a temperature above 60° C., preferably 70° C. The mixture is heated to a temperature less than 100° C. preferably less than 90° C. The polymerization is stopped when the partly polymerized mixture is having a viscosity between 100 cPoisse and 5000 cPoise at 20° C. as measures with a Brookfield viscosimeter. The polymerization is stopped by adding methyl methacrylate having a temperature below 20° C., preferably below 10° C. The quantity of the added methyl methacrylate is chosen to obtain a liquid mixture having between 2 wt % and 30 wt % of macromolecular sequences (II) in the mixture.

With regards to the radical initiator, it can be chosen from diacyl peroxides, peroxyesters, dialkyl peroxides, peroxyacetals or azo compounds. Radical initiators which may be suitable are, for example, isopropyl carbonate, benzoyl peroxide, lauroyl peroxide, caproyl peroxide, dicumyl peroxide, tert-butyl perbenzoate, tert-butyl per-2-ethylhexanoate, cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, 1,1-di(t-amylperoxy)cyclohexane, tert-butyl peroctoate, azodiisobutyronitrile (AIBN), azodiisobutyramide, 2,2'-azobis(2,4-dimethylvaleronitrile), 4,4'-azobis(4-cyano-pentanoic acid) or 1,1'-azobis(cyanocyclohexane). It would not be departing from the scope of the invention to use a mixture of radical initiators chosen from the above list.

The content of radical initiator with respect to the monomers of the mixture which is cast in the mold varies from 100 to 2000 ppm by weight, preferably between 200 and 1000 ppm by weight. This content can vary as a function of the application and of the thickness targeted.

The composition can comprise also other compounds, which are not taken into account for the calculation of the weight ratios between the compounds mentioned before.

Other ingredients can be optionally added to the mixture which is cast in the mold. Mention may be made, without implied limitation, of:
- opacifying fillers, such as $TiO_2$ or $BaSO_4$, generally used in the form of pastes prefabricated in a plasticizer of dialkyl phthalate type;
- colored organic dyes or colored inorganic pigments;
- plasticizers;
- UV-stabilizing additives, such as Tinuvin P from Ciba, used at contents of 0 to 1000 ppm and preferably 50 to 500 ppm, with respect to the mixture which is cast in the mold;
- light or heat stabilizers, such as, for example, Tinuvin 770;
- antioxidants;
- flame-retarding additives, such as, for example, tris(2-chloropropyl) phosphate;
- thickening agents, such as, for example, cellulose acetate butyrate;
- mold-release agents, such as, for example, dioctyl sodium sulfosuccinate, used at contents of 0 to 500 ppm and preferably 0 to 200 ppm, with respect to the mixture which is cast in the mold;
- inorganic or organic fillers (for example polyamide, PTFE or $BaSO_4$) intended to scatter light (for example, to give sheets which can be edge-lit).

The sheet of the composition according to the invention or made by the process according to the invention can at least on one surface be coated with varnish.

The composition according to the invention can be part of a multilayer composition.

The sheet of the composition according to the invention or made by the process according to the invention can be used as monolithic sheet or in a multilayer structure.

The multilayer structure comprises the sheet of or with the composition according to the invention as one layer. The layer could be an external layer or an internal layer.

The other layers of the multilayer structure beside the layer made of the sheet with the composition according to the invention, can be polymer layers or glass layers.

Still another aspect of the present invention is the use of the composition according to the invention.

The fields of use are crafts, vehicles, mobile arrangements, and fixed installations. The use is in relation to observation slots, viewing openings, personal protection equipment, security glazing.

A first preferred embodiment is the use for bullet resistant applications and notably for bullet resistant sheets.

[Methods of Evaluation]

The glass transition temperature Tg is measured according ISO 11357-2/2013 by DSC.

Molecular Weight—The mass average molecular weight (Mw) and the number average molecular weight (Mn) of the polymers are measured with by size exclusion chromatography (SEC). The polydispersity index PI is as commonly known calculated by PI=Mw/Mn.

Swelling Index—A sample is cut of a sheet and its mass $m_0$ is estimated. Usually samples are cut out that have a mass of $m_0$ of about 0.5 g or close to 0.5 g. The sample is placed in a vial with an agitator. 2 ml of acetone are added. It is stirred for 72 hours. Then the mass $m_f$ of the sample swelled by the acetone is measured. The swelling index in % is calculated by the ratio $(m_f-m_0)/m_0*100$.

The bullet impact trials are made with a pneumatic gas gun equipment. It comprises two sensors for measuring the velocity of the projectile, a target holder, a system for measuring the force of the impact and a catcher for the projectile. The initial impact velocity $V_0$ is adjusted with the pressure of the pneumatic gas gun. The diameter of the gun barrel is 13 mm and close to the diameter of the projectile. The maximum pressure used is 16 bars which gives an impact velocity of 181 m/s for a conical projectile of a mass of 30 g. The two sensors for measuring the velocity of the projectile are equipped with a laser for measuring the velocity: the first for measuring the initial impact velocity $V_0$ and the second for measuring the residual velocity $V_R$ after the projectile has perforated the sample placed in the target holder.

The products tested are sheet samples of 100×100 mm with a thickness of 4 mm. The projectile has a diameter of 12.8 mm a body length of 25 mm and a half angle of conical nose is 36°. The projectile is made of a steel armor having a hardness of 640 HV. The weight of the projectile is 28 g. For each sheet, the velocity $V_0$ is increased progressively for determining the minimal velocity $V_{mini}$ from which the projectile passes through or perforates the sample. For a given velocity, five trials are made and the minimal velocity $V_{mini}$ corresponds to the minimal velocity for which the five samples have been perforated.

EXAMPLES

The synthesis of the composition according to the invention in form of a sheet is made in four steps.

Step 1: Synthesis of Alcoxyamine TRIAMINS 189 g of ethanol, 100 g of N-tertiobutyl-1-diéthylphosphono-2,2-dimethylpropyl nitroxyde and 26.5 g of pentaerythritol triacrylate are placed in a 500 mL reactor. The mixture is heated with stirring at 80° C. for 4 hours. The reaction mixture is then discharged and the ethanol is evaporated off using a rotary evaporator at 57° C. under vacuum. 126 g of TRIAMINS are obtained quantitatively.

Step 2: Synthesis of Macro Initiator

Two types of the macro-initiator are synthesized with the TRIAMINS made in step 1.

Synthesis of a macro-initiating polyalkoxyamine 1

The following are introduced into a 2-liter metal reactor equipped with an impeller stirrer, a jacket for heating by circulation of oil and a vacuum/nitrogen inlet:

640 g of butyl acrylate
96 g of styrene
6.64 g of TRIAMINS.

After introduction of the reagents, the reaction mixture is degassed via three vacuum/nitrogen flushes. The reactor is then closed and the stirring (50 rpm) and heating (nominal temperature: 125° C.) are started. The temperature of the reaction mixture reaches 113° C. in about 30 minutes. The pressure stabilizes at about 1.5 bar. The reactor temperature is maintained at a stage of 115° C. for 522 minutes. After cooling, 742 g of a mixture with a solids content of 70% are recovered. The excess butyl acrylate is then removed by evaporation at 70° C. under reduced pressure over 3 hours. The butyl acrylate/styrene weight ratio of the macro-radical obtained is 83:17. Analysis of the macro-initiator by GPC calibrated using polystyrene samples gives the following results: $M_n$: 138 750 g/mol; $M_w$: 453 400 g/mol; polydispersity: 3.27. The macro-initiator is diluted with methyl methacrylate under stirring at 50° C., so that the macro-initiator is at 45 wt % in the solution.

Synthesis of a macro-initiating polyalkoxyamine 2 is made identical as polyalkoxyamine 1 except that 9.2 g of TRIAMINS are used. Analysis of the macro-initiator by GPC calibrated using polystyrene samples gives the following results: Mn: 100 670 g/mol; $M_w$: 245 690 g/mol; polydispersity: 2.44.

Step 3: Preparation of syrup. The two obtained macro-initiator are further diluted with methyl methacrylate (MMA). 400 g of the solution of the macro-initiator is at 45 wt % is mixed with 1200 g of MMA, degassed via three vacuum/nitrogen flushes, and heated to 70° C. for starting polymerization. Samples are taken and the viscosity with a Brookfield viscosimeter is measured at 20° C. When the viscosity is at 2000 cPoisse, 850 g of MMA at 5° C. are added in order to stop polymerization.

Step 4: preparation of cast sheet. The syrup is mixed under stirring with varying wt % of 1,4-butylene glycol dimethacrylate (BGDM) relative to the MMA in the composition, 735 ppm of 1,1'-azobis(cyclohexanecarbonitrile) (VAZO 88), 0.05 wt % of Tinuvin P, 0.05 wt % of Tinuvin 770DF in view of total mass, degassed via vacuum/nitrogen flushed.

The mixture is subsequently cast in a mold made of two glass plates closed by a PVC gasket ring. The mold is first heated at a temperature of 71° C. for 450 minutes and then at 90° C. for 270 minutes. The sheet is subsequently subjected to a post-polymerization at a temperature of 125° C. for 60 minutes.

The mold is opened to recover the respective sheets of 4 mm thickness and samples of different size are cut off for performing tests.

Comparative Example 1

A cast sheet polymerization is performed by mixing MMA as monomer the intiator and a crosslinker.

Example 1

The cast sheet is made according to the process describe before with macro-initiating polyalkoxyamine 1 and 0.6 wt % 1,4-butylene glycol dimethacrylate.

Example 2

The cast sheet is made according to the process describe before with macro-initiating polyalkoxyamine 1 and 1 wt % 1,4-butylene glycol dimethacrylate.

Example 3

The cast sheet is made according to the process describe before with macro-initiating polyalkoxyamine 1 and 4 wt % 1,4-butylene glycol dimethacrylate.

Example 4

The cast sheet is made according to the process describe before with macro-initiating polyalkoxyamine 2 and 4 wt % 1,4-butylene glycol dimethacrylate.

TABLE 1 compositions and results

|  | Comparative Example 1 | Example 1 | Example 2 | Example 3 | Example 4 |
|---|---|---|---|---|---|
|  | PMMA standard |  |  |  |  |
| macro-initiator |  | polyalkoxy-amine 1 | polyalkoxy-amine 1 | polyalkoxy-amine 1 | polyalkoxy-amine 2 |
| Mn/[g/mol] |  | 138 750 | 138 750 | 138 750 | 100 670 |
| Mw/[g/mol] |  | 453 400 | 453 400 | 453 400 | 245 690 |
| PI |  | 3.28 | 3.28 | 3.28 | 2.44 |
| Macro-initiator in sheet [%] | — | 7.5 | 7.5 | 7.5 | 7.5 |
| BDMA/MMA [%] | 0.6 | 0.6 | 1 | 4 | 4 |
| Vazo88/MMA [%] | 325 ppm (AZDN) | 735 ppm | 735 ppm | 735 ppm | 735 ppm |
| Tinuvin P/total masse [%] | 60 ppm | 0.05 | 0.05 | 0.05 | 0.05 |
| Tinuvin 700DF/total masse/[%] | 60 ppm | 0.05 | 0.05 | 0.05 | 0.05 |
| Choc Charpy/[kJ/m2] | 12 | 50 | 36 | 28 | 25 |
| Swelling index [%] | 150 | 145 | 132 | 95 | 95 |
| $V_{mini}$ [m/s] | 18 | 38 | 45 | 38 | 28 |

As shown in table 1 the compositions according to the examples show better impact resistance expressed in choc charpy results and better bullet resistance expressed in $V_{mini}$ than a crosslinked sheet not having elastomeric domains having a characteristic dimension of less than 100 nm consisting of macromolecular sequences (II) having a flexible nature with a glass transition temperature of less than 0° C.

However the composition having the highest impact resistance does not have the best bullet resistance. There is a compromise between weight average molecular weight Mw of macromolecular sequences (II) having a flexible nature with a glass transition temperature of less than 0° C., the polydispersity index PI and the content the content of crosslinking agent.

The invention claimed is:

1. A polymeric composition suitable for bullet resistant applications comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., wherein the macromolecular sequences (II) having a flexible nature have a weight average molecular weight Mw of between 150,000 and 800,000 g/mol; and wherein the crosslinked (meth)acrylic composition comprises 4%-10% of a crosslinking agent by weight of the crosslinked (meth)acrylic composition;
wherein polydispersity index PI of the macromolecular sequences (II) having a flexible nature is between 3.0 and 6.0.

2. The polymeric composition according to claim 1, wherein the weight average molecular weight Mw of the macromolecular sequences (II) having a flexible nature is between 225,000 and 600,000 g/mol.

3. The polymeric composition according to claim 1, wherein the weight average molecular weight Mw of the macromolecular sequences (II) having a flexible nature is between 240,000 g/mol and 600,000 g/mol.

4. The polymeric composition according to claim 1, wherein the weight average molecular weight Mw of the macromolecular sequences (II) having a flexible nature is between 255,000 g/mol and 600,000 g/mol.

5. The polymeric composition according to claim 1 wherein the content of crosslinking agent is between 4% and 8% by weight, with respect to the crosslinked (meth)acrylic composition.

6. The polymeric composition according to claim 1, wherein the content of crosslinking agent is between 4% and 5% by weight, with respect to the crosslinked (meth)acrylic composition.

7. The polymeric composition according to claim 1, wherein the macromolecular sequences (II) in the polymeric composition is between 1 wt % and 30 wt %, with respect to the polymeric composition comprising crosslinked (meth)acrylic composition and macromolecular sequences (II).

8. The polymeric composition according to claim 1, wherein the matrix (I) comprises from 51 wt % to 100 wt %, of methyl methacrylate monomer units.

9. The polymeric composition according to claim 1, wherein the matrix (I) comprises from 90 wt % to 100 wt % of methyl methacrylate monomer units.

10. The polymeric composition according to claim 1, wherein the macromolecular sequences (II) are prepared from one or more monomer(s) Mo2 chosen from:
acrylic monomers of formula $CH_2=CH-C(=O)-O-R_1$, where $R_1$ denotes a hydrogen atom or a linear, cyclic or branched $C_1$-$C_{40}$ alkyl group optionally substituted by a halogen atom, or a hydroxyl, alkoxy, cyano, amino, or epoxy group;

methacrylic monomers of formula $CH_2=C(CH_3)-C(=O)-O=R_2$, where $R_2$ denotes a hydrogen atom, or a linear, cyclic, or branched $C_1$-$C_{40}$ alkyl group optionally substituted by a halogen atom, or a hydroxyl, alkoxy, cyano, aminoor epoxy group; and
vinylaromatic monomers.

11. The polymeric composition according to claim 1, wherein the composition possesses a swelling index of less than 200% in acetone at 20° C.

12. The polymeric composition according to claim 1, wherein the composition is in form of a sheet or a cast sheet.

13. The polymeric composition according to claim 1, wherein said composition is part of a multilayer composition.

14. A process for manufacturing the polymeric composition according to claim 1 comprising the steps of:
a) preparing the macromolecular sequences (II)
b) mixing the macromolecular sequences (II) of step a) with methyl methacrylate, and optionally the crosslinking agent, optionally at least one comonomer M01 and optionally at least one radical initiator;
c) mixing the composition comprising the macromolecular sequences (II) and methyl methacrylate with 4% to 10% of the crosslinking agent by weight of the methylmethacrylate, optionally the comonomer M01 if comonomer M01 was not added in step b), and optionally the at least one radical initiator, if the at least one radical initiator has not been added in step b);
d) casting the mixture obtained in step c) in a mold and then heating the mixture according to a temperature cycle in order to obtain a cast sheet.

15. The process according to claim 14, wherein step a) comprises: preparing the macromolecular sequences (II) by mixing monomer(s) intended to form the macromolecular sequences (II), with an alkoxyamine of general formula $Z(-T)_n$, n which Z denotes a polyvalent group, T denotes a nitroxide and n is an integer greater than or equal to 1.

16. A process for manufacturing the polymeric composition according to claim 1, comprising the following steps:
a) preparing the macromolecular sequences (II);
b1) mixing the macromolecular sequences (II) of step a) with methylmethacrylate;
b2) partly polymerizing the macromolecular sequences (II) and methyl methacrylate obtained in step b1) and optionally adding additional methyl methacrylate;
c) mixing the partly polymerized composition obtained in step b2) with crosslinking agent, optionally at least one comonomer M01, and at least one radical initiator.

17. A process for manufacturing a polymeric composition according to claim 1, comprising the following steps:
a1) preparing an alkoxyamine of general formula $Z(-T)_n$, in which Z denotes a polyvalent group, T denotes a nitroxide and n is an integer greater than or equal to1;
a2) preparing the macromolecular sequences (II) by mixing monomer(s) intended to form the macromolecular sequences (II) with the alkoxyamine of step a1);
b1) mixing the macromolecular sequences (II) of step a2) with methyl methacrylate;
b2) partly polymerizing the macromolecular sequences (II) and methyl methacrylate and optionally adding optionally additional methyl methacrylate;
c) mixing the partly polymerized composition obtained in step b2) with crosslinking agent, optionally at least one comonomer M01, and at least one radical initiator;

d) casting the mixture obtained in step c) in a mold and then heating the mixture according to a temperature cycle in order to obtain a cast sheet.

18. The process according to claim 15, wherein the alkoxyamine has the following formula:

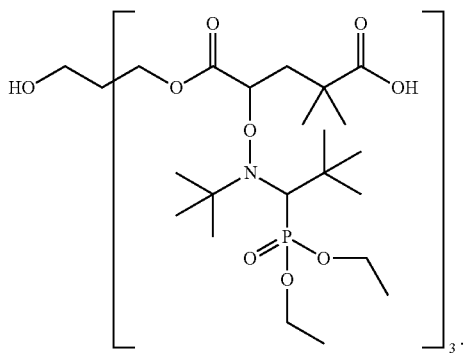

19. A bullet resistant material comprising the polymeric composition according to claim 1.

20. The bullet resistant material of claim 19, wherein said bullet resistant material is an observation slots, viewing openings, personal protection equipment, or security glazing.

21. The polymeric composition according to claim 10, wherein the one or more monomer(s) Mo2 comprise at least one of methacrylic acid, methyl methacrylate, ethyl methacrylate, propyl methacrylate, n-butyl methacrylate, isobutyl methacrylate, tert-butyl methacrylate, 2-ethylhexyl methacrylate, glycidyl methacrylate, hydroxyalkyl methacrylates, methacrylonitrile, acrylic acid, methyl acrylate, ethyl acrylate, propyl acrylate, n-butyl acrylate, isobutyl acrylate, tert-butyl acrylate, 2- ethyl-hexyl acrylate, glycidyl acrylate, hydroxyalkyl acrylates, or acrylonitrile.

* * * * *